United States Patent [19]

Beard

[11] Patent Number: 4,836,647
[45] Date of Patent: * Jun. 6, 1989

[54] LOW DIFFERENTIAL 3-D VIEWER GLASSES AND METHOD WITH SPECTRAL TRANSMISSION CHARACTERISTICS TO CONTROL RELATIVE INTENSITIES

[76] Inventor: Terry D. Beard, 1407 North View Dr., Westlake Village, Calif. 91362

[*] Notice: The portion of the term of this patent subsequent to Nov. 10, 2004 has been disclaimed.

[21] Appl. No.: 154,068

[22] Filed: Feb. 9, 1988

[51] Int. Cl.$^4$ .................... G02B 27/22; G03B 21/32
[52] U.S. Cl. .................................. 350/132; 350/144; 352/86; 358/89
[58] Field of Search .............. 350/144, 132, 133, 131, 350/130; 358/3, 88, 89, 91; 352/86

[56] References Cited

U.S. PATENT DOCUMENTS

| | | | |
|---|---|---|---|
| 3,445,153 | 5/1969 | Marks et al. | 350/144 |
| 4,131,342 | 12/1978 | Dudley | 352/86 |
| 4,705,371 | 11/1987 | Beard | 350/133 |

FOREIGN PATENT DOCUMENTS 3308623  9/1984  Fed. Rep. of Germany ...... 350/133

OTHER PUBLICATIONS

W. F. Finch, "Synthesis of Three-Dimensional . . . ", IBM Tech. Dis. Bull., vol. 23, No. 6, pp. 2391–2392, Nov. 1980 (358189).

Primary Examiner—Jon W. Henry
Attorney, Agent, or Firm—Koppel & Jacobs

[57] ABSTRACT

A method for creating a 3-D television effect is disclosed in which a scene is recorded with a relative lateral movement between the scene and the recording mechanism. The recording is played back and viewed through a pair of viewer glasses in which one of the lenses is darker and has a spectral transmission characterized by a reduced transmissivity at at least one, and preferably all three, of the television's peak radiant energy wavebands. The lighter lens, on the other hand, has a spectral transmission characterized by a reduced transmissivity at wavelengths removed from the television energy peaks. The result is a substantially greater effective optical density differential between the two lenses when viewing television than in normal ambient light. This produces a very noticeable 3-D effect for television scenes with the proper movement, while avoiding the prior "dead eye" effect associated with too great a density differential in ordinary light. Further enhancement is achieved by providing the darker lens with a higher transmissivity in the blue and red regions than in the yellow or green regions.

25 Claims, 5 Drawing Sheets

LOW DIFFERENTIAL 3-D VIEWER GLASSES AND METHOD WITH SPECTRAL TRANSMISSION CHARACTERISTICS TO CONTROL RELATIVE INTENSITIES

BACKGROUND OF THE INVENTION

1. Field of the Invention

This invention relates to the production of three-dimensional images for television.

2. Description of the Related Art

Various techniques have been used in the past to produce stereoscopic (three-dimensional) images for motion pictures or television. In general, these techniques involve two camera systems in which two different pictures are taken from slightly different camera angles and locations. The object is to simulate the manner in which depth is perceived by a pair of human eyes, which are themselves slightly offset from each other and thus view images at slightly different angles. The two camera images are superimposed and presented to the viewer simultaneously on a television or movie screen. The images are then separated in some fashion for the viewer so that one eye sees only one image, and the other eye sees only the other image. In this way an illusion of depth is created by simulating normal vision.

One technique which has been used to implement this approach is called the anaglyphic 3-D process, and has been employed in motion pictures and television. This technique uses color filters to separate the two images. The images are color coded, for example with red and green respectively, and the viewer is provided with glasses having different colored filters in front of each eye. Each filter rejects the image that is not intended for that eye, and transmits the image which is intended to be seen by that eye. A red color filter will pass only the red image, while a green color filter will pass only the green image. If the left eye image is presented as a green image and the right as a red image, and a green filter is placed in front of the left eye and a red filter in front of the right eye, the proper images will be directed to the proper eye and a 3-D image will be perceived by the viewer. An example of the anaglyphic process is disclosed in U.S. Pat. No. 3,697,679, entitled "Stereoscopic Television System", by the present inventor Terry D. Beard together with Eric R. Garen. A major shortcoming of the anaglyphic method is that the color filters interfere with the presentation of a high quality full color image. Color filters which fully reject the undesired image are difficult to make, with the result that the 3-D effect is impaired. This process is also difficult to use successfully in television because of the limited bandwidth transmission of color information in commercial broadcasts. The result of this limited bandwidth transmission is either ghost image interference or low resolution images.

Another 3-D process used in motion pictures is the so-called "Polaroid" process, in which the left and right eye images are separated by the use of polarizing light filters. The left eye image is projected onto the screen through a polarizing filter rotated 45° to the left of vertical, while the right eye image is projected onto the screen through a polarizing filter rotated 45° to the right of vertical. In this way the polarization of the two images are at right angles, and similarly polarized filters placed in front of each of the viewer's eyes will cause the proper image to be transmitted to each eye. This method is not adapted for 3-D television, and its use for motion pictures requires a special non-depolarizing projection screen.

Another technique which has been used to produce 3-D images on television involves the sequential presentation of left and right eye images to the viewer, together with the use of synchronized electro-optical glasses to switch on the filter in front of each eye when its image is being presented. This process is complicated and expensive, and requires special broadcasting and receiving equipment and electro-optical glasses.

A new technique for achieving 3-D television with the use of only one camera, and one image on the television screen, is described in U.S. Pat. No. 4,705,371 to the present inventor. This technique produces a noticeable 3-D effect by combining a particular type of viewer glasses with a specific filming technique. A moving picture of a scene is recorded such that a relative lateral movement is created between the scene and the recording mechanism. The lateral movement can result from movement of the objects themselves, or by moving the camera in various ways. The recorded scene is then viewed through a pair of glasses in which one lens has a greater optical density than the other lens, with the darker lens having a substantially higher transmissivity in the blue region than in the green or yellow regions. The optical density of the darker lens may also be reduced in the red region.

Since this last technique avoids the double images inherent in other 3-D television approaches, it has the distinct advantage of presenting a picture which appears to be perfectly clear and natural to an audience which does not have viewer glasses, and yet has a noticeable 3-D effect when the glasses are warn. However, the requirement for a substantial difference in neutral density has been found to be somewhat of a distraction for the viewer. The best 3-D effects occur with a neutral density difference between the two lenses in the order of 1.3 or more. With this large a differential, the reduced amount of light reaching the darkened eye is quite noticeable compared to the lighter lens, giving rise to a "dead eye" effect for that eye when objects other than the television screen are viewed. This can reduce the overall enjoyment of the 3-D viewing experience.

U.S. Pat. No. 4,705,371 proposed a number of modifications to the viewer glasses to reduce the "dead eye" effect. These included darkening the peripheral field of the lighter density lens while lightening the peripheral field of the darker density lens, or providing the light lens in the form of a light vertical strip with darker vertical strips on either side, and the dark lens as a dark vertical strip with light vertical strips on either side. The purpose of both approaches was to concentrate the neutral density differential in the center portion of the lenses, where the viewer generally concentrates his gaze. However, neither approach is very effective, and they give an odd appearance to the glasses while substantially increasing the complexity and expense of manufacture.

SUMMARY OF THE INVENTION

These and other problems associated with the prior art are overcome by the present invention, the object of which is to provide a simple and effective 3-D method and apparatus which is applicable to conventional color or black and white television, and substantially reduces the "dead eye" effect of the prior single image system without degrading its 3-D effect or adding to the cost or complexity of manufacture.

A further object of the invention is to provision of a 3-D method and apparatus which provides a high quality 3-D image in full color with no ghost images, which requires only a single standard camera to shoot, and which uses inexpensive 3-D glasses.

To realize these objects, a moving picture of a scene is recorded with a recording mechanism such as a standard television camera. The scene is recorded such that a relative lateral movement is created between the scene and the recording mechanism.

The recorded scene is viewed through viewer glasses in which the left and right lenses have transmission characteristics that are coordinated with the spectral-energy emission of the television screen, so that the darker lens has a reduced transmissivity at at least one of the screen's peak energy wavebands. This causes the differential in light transmission between the two lenses to be greater when viewing the television screen than when receiving normal ambient light, thereby substantially mitigating the "dead eye" effect while maintaining an effective density differential when viewing the screen that is sufficient for high quality 3-D effects. The effective density differential in ordinary light can be further reduced, again without significantly degrading 3-D quality, by reducing the transmissivity of the lighter lens at wavelengths removed from the television energy peaks. In this manner the effective optical density differential between the two lenses when viewing the television screen can be made to be 1.4 or more, and yet significantly less than 1.2 when receiving normal ambient light.

Standard television screens have radiant energy peaks in the purple-blue, yellow-green and red-orange regions, and the darker lens has a lower transmissivity in at least one (and preferably all three) of these regions. The 3-D effect is further enhanced by providing the darker lens with a higher transmissivity in the blue region, and also in the red region, than in yellow or green.

These and other objects and features of the invention will be apparent to those skilled in the art from the following detailed description of preferred embodiments, taken together with the accompanying drawings, in which:

DETAILED DESCRIPTION OF THE PREFERRED EMBODIMENTS

The present invention utilizes a known principle of vision referred to as the Pulfrich effect. According to this principle, the human eye interprets images differently depending upon the image brightness. This difference in processing is a complicated function of the human visual system, but the effective result is a delay in processing images of lesser brightness.

Applicant makes use of this effect to produce a stereoscopic system that completely eliminates the prior art requirement for duplicate cameras and separation of images. The invention operates on the principle that, if a viewer is presented with a scene from a continuously moving point of reference and one eye looks at the image through a filter that causes the image to appear darker than that seen by the other eye, the effect is to delay the processing of the image seen by the eye which looks through the darker filter. This causes that eye to "see" the image as it was a short period of time before the lighter image perceived by the other eye. The result is the creation of a dramatic and entirely real three-dimensional effect.

The duration of the image delay has been found to be related to the difference in absolute optical densities of the left and right eye filters. "Optical density" has an inverse logarithmic relationship to transmissivity; an optical density of 0 corresponds to 100% transmission, while an optical density of 100 corresponds to 10% transmission. A difference in the overall optical density between the two filters of between approximately 1.0 and approximately 2.0 has been found to produce best result, but somewhat lesser differentials will also work. In one example in which good performance was obtained, a clear lens was used for the lower density lens, with the other lens having an optical density of 1.4.

Figure 1:
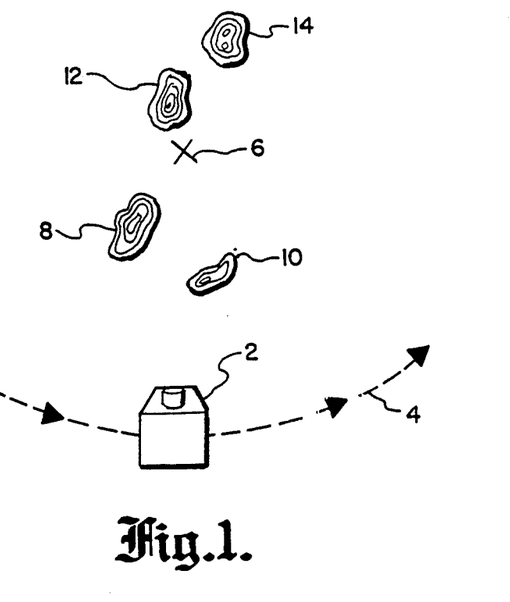
FIG. 1 is an illustration of a television camera taking a moving picture in accordance with the invention.

To obtain a three-dimensional effect using this process, there should be a relative lateral movement between the camera and the scene. This produces a movement from one viewer lens to the other when the image is seen through appropriate viewer glasses. Either the camera or the objects in the scene, or both, should have continuous lateral movement. One preferred way of obtaining the desired movement is to rotate the camera about a fixed reference point. Referring to FIG. 1, a movie or video camera 2 is shown moving along an arc 4 which is centered on point 6, the camera being continuously directed toward point 6 as it moves along the arc. If the film or video tape is then played back and viewed through glasses which have a darker left eye filter and a lighter right eye filter, the scene will appear in 3-D with point 6 appearing to be at the screen level, objects 8 and 10 in their proper relative positions in front of the screen, and objects 12 and 14 in their proper relative positions behind the screen.

Figure 2:
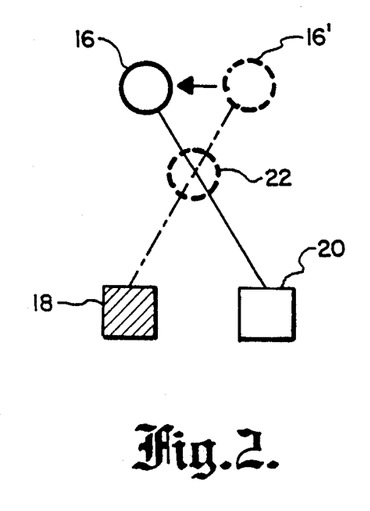
FIGS. 2 and 3 are illustrations of the effect of lateral movement on the image seen by a viewer wearing viewer glasses constructed in accordance with the invention.
Figure 3:
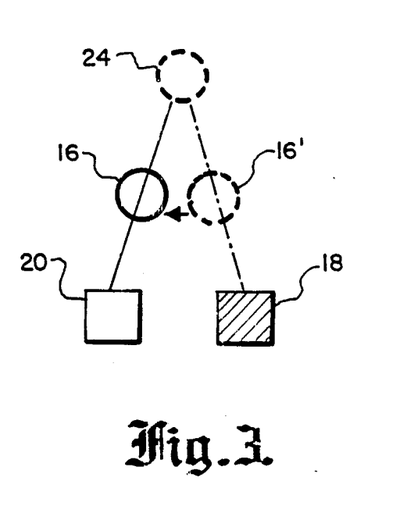

If the camera movement is now reversed from that shown in FIG. 1, so that it traverses from right to left, the images of the various objects when seen through the same viewer glasses will also be reversed with respect to reference point 6. That is, objects 8 and 10 will appear further away, behind the screen, while objects 12 and 14 will appear to be closer, in front of the screen. The explanation of this phenomenon is illustrated in FIGS. 2 and 3. In FIG. 2, an object 16 appearing on a television screen is shown as having moved from an earlier position 16'. The object is viewed through a set of viewer glasses, the left and right lenses of which are represented by squares 18 and 20. Left lens 18 has a higher optical density (i.e., is darker) than right lens 20, and therefore causes the viewer to perceive the object through his left eye at location 16', whereas the object is perceived by the right eye at its actual location on the screen. The result is that the object appears to both eyes at the intersection of the lines between each lens and the respective image which it sees. This intersection occurs at location 22, which is in space in front of the screen.

If the lenses are now reversed as in FIG. 3 so that the lighter lens 20 is on the left and the darker lens 18 on the right, the same object 16 moving in the same direction will appear behind the screen, rather than in front. This is because the object 16 will be perceived through the left hand lens 20 at its real position, and through the right hand lens 18 at its previous position 16'. Lines drawn between each lens and their respective images intersect at location 24, behind the screen.

If the lenses were now to be returned to the positions shown in FIG. 2, but the direction of movement of object 16 reversed so that it now moves from left to right, the 3-D effect would be the same as FIG. 3, that is, the object would be seen behind the screen. Thus, the relative lateral movement between the objects appearing on the screen and the two lenses of the viewer glasses determine the 3-D effect, and the depth perception can be reversed by reversing the relative direction of movement between the objects on the screen and the light and dark viewer lenses.

Figure 4:
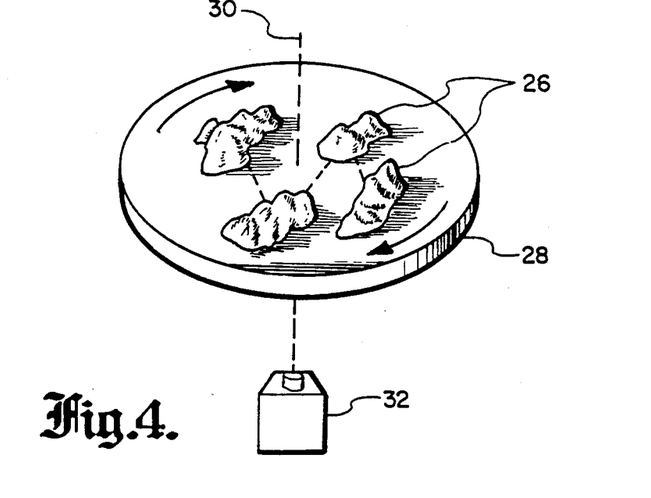
FIGS. 4–6 are illustrations of other techniques of taking moving television pictures in accordance with the invention.

Referring now to FIG. 4, a set of objects 26 is shown rotating in a clockwise direction on turntable 28 about rotational axis 30, while being photographed by camera 32. The photographed objects will appear in proper depth perspective when viewed with glasses having a left eye filter darker than the right eye filter.

The amount of depth perceived has been found to be a function of the lateral speed of the object relative to the camera, and the difference in density between the two eye filters. With the rotational arrangement of FIG. 4, depth perception increases with the speed of rotation, up to a point at which the images are rotating so fast they cannot be clearly preceived. An upper limit on the rotational rate for good perception of the 3-D effect has been found to be about 30 revolutions per minute, with a typical useful rotational speed of about 10-20 revolutions per minute.

Figures 5, 6:
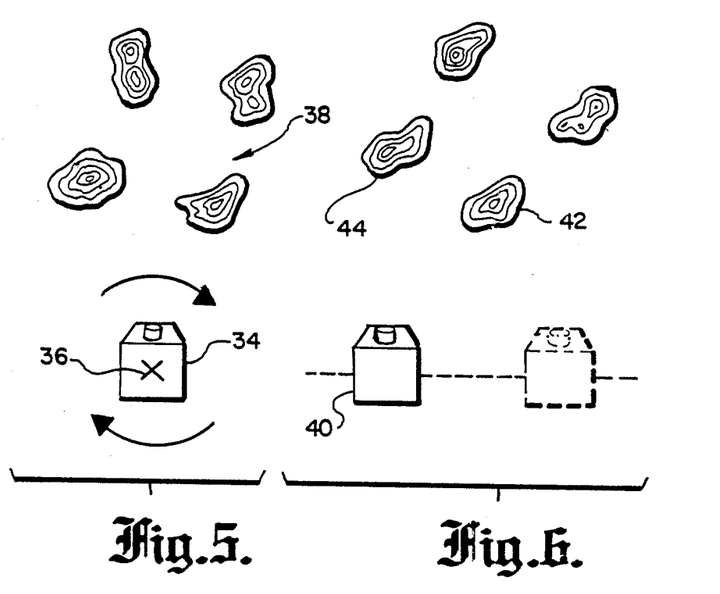

Another way of obtaining the required lateral movement between the scene and the camera is illustrated in FIG. 5, in which the camera 34 rotates about an internal axis 36. In this type of shot the depth effect is enhanced by having something in the field move with the camera pan. With glasses having the right lens darker than the left, objects or scenery 38 moving left to right across the projection screen will appear in front of the screen, while objects moving right to left will appear behind the screen. Thus, in FIG. 5 camera 34 panning in a clockwise direction when viewed from above will record the scene 38 in such a way that, when viewed with glasses with a darker right eye filter, the scene will appear behind the plane of the viewing screen.

In another example of camera technique, the center of camera rotation may be considered as being at infinity. In this case, illustrated in FIG. 6, the camera 40 moves laterally along a straight line while pointing continuously at an angle to its axis of movement toward an imaginary point infinitely far away. A scene recorded in this fashion, when viewed with glasses having the right lens darker than the left, will result in the point at infinity appearing at screen level. Everything else in the picture will appear in front of the screen, that is, between the screen and the viewer. Objects will appear in their proper depth relationship, with object 42 appearing closer to the viewer than object 44, and so on.

The above method for producing stereoscopic images can also be used in conjunction with computer generated images. Computers can create and manipulate images as through they were three-dimensional and rotate them in space or, alternatively, they can rotate the viewer's observation point in space according to the methods described above to create three-dimensional computer generated images.

Many times real world objects may not be moving in a direction or at rate compatible with the creation of a good 3-D effect using the above process. This problem can be substantially alleviated by using computer image manipulation devices, such as the Ampex ADO, to flip the image and reverse the left and right images during portions of the recording to adjust the stereoscopic effect during such portions. A similar kind of processing may be used to increase or decrease the speed of rotation, scan or other relative lateral movement between the camera and the scene to bring the 3-D effect to the desired level.

The stereoscopic method described above can also be used to create special 3-D effects. The 3-D effects created can conflict with other visual information being presented, resulting in a scene which appears with a very unreal kind of depth, such as larger objects appearing further away rather than closer. This phenomenon can be very effective when used with computer generated art.

Figure 7:
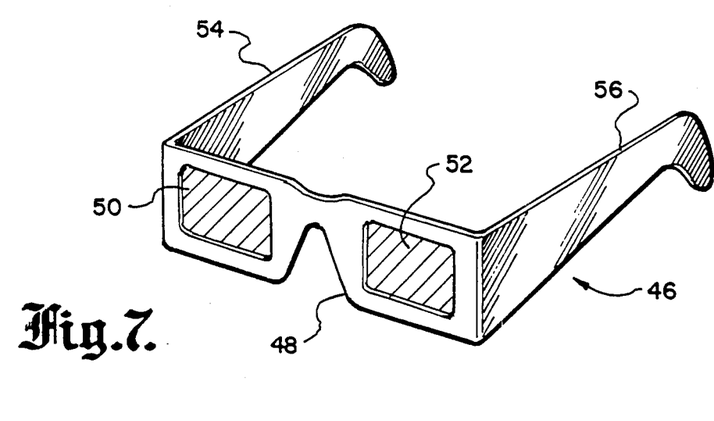
FIG. 7 is a perspective view of viewer glasses constructed in accordance with the invention.

A pair of viewer glasses 46 constructed in accordance with the invention is shown in FIG. 7. The glasses include a frame 48 in which a pair of lenses 50, 52 are mounted, and ear supports 54, 56 for engaging the ears and holding the glasses in place on a viewer's face. Lenses 50 and 52 have different optical densities, so that the viewer perceives a 3-D effect from an image with an appropriate lateral movement. However, the lenses are specially prepared with color dyes that provide sufficient brightness differential to achieve a good 3-D television effect, and yet have a significantly lower brightness differential in normal ambient light so as to substantially mitigate the "dead eye" effect.

This dual light transmission capability is achieved by giving the lenses individual color tints that coordinate with the spectral energy emission characteristics of a standard color television set. The interior screens of television cathode ray tubes are coated with an orderly array of three types of phosphors, each of which when excited with a high velocity electron beam emits light of one or the other of the three additive primary colors-blue, green or red. The three types of phosphors may be arrayed in triangular groups, or in lines. For black and white sets, phosphor blends are used that are carefully matched so that no separation of phosphors occurs, and hence screen color uniformity is obtained.

Figure 8:
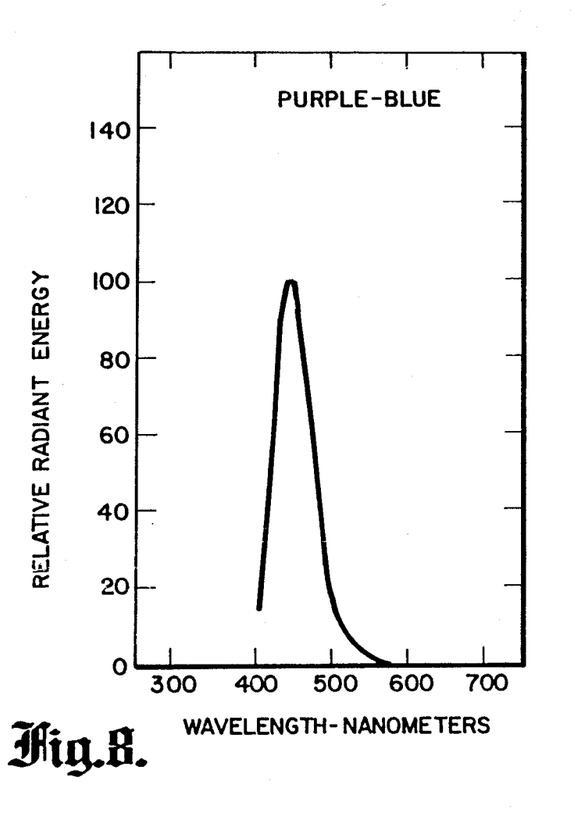
FIGS. 8, 9 and 10 are graphs of typical spectral energy emission characteristics for a television screen.
Figure 9:
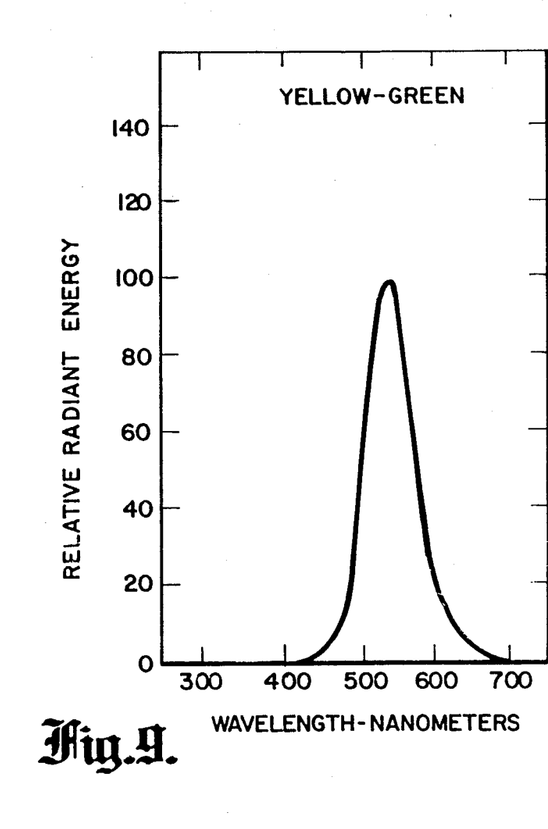
Figure 10:
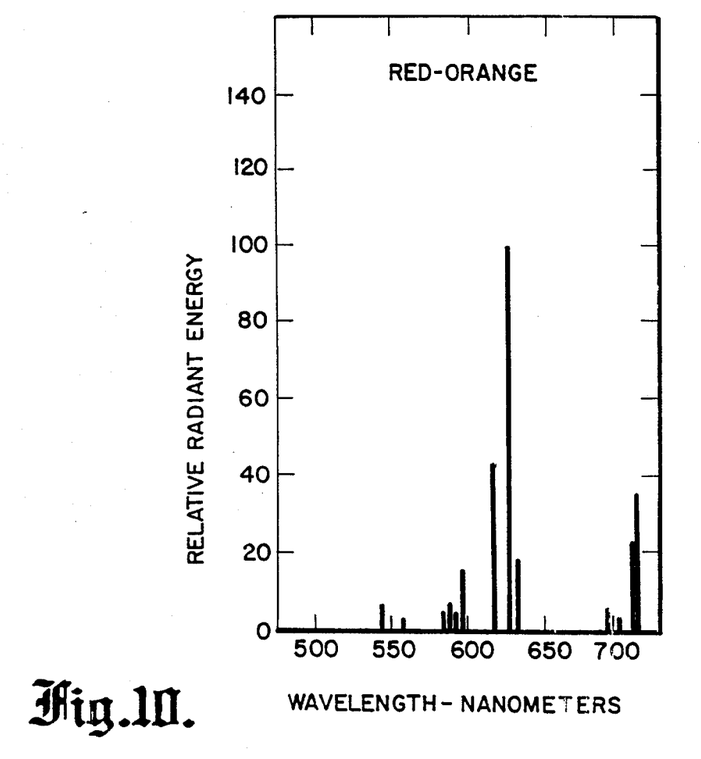

A typical spectral energy emission characteristic for a television screen is illustrated in FIGS. 8-10, which show the emission peaks produced in the purple-blue, yellow-green and red-orange regions, respectively. A normalized plot of relative radiant energy versus wavelength is given in each figure. Radiant energy peaks occurred at about 445 nm for purple-blue (FIG. 8), 545 nm for yellow-green (FIG. 9) and 627 nm for red-orange (FIG. 10). The amount of radiant energy drops dramatically in areas removed from these peak wavelengths.

The lenses of the viewer glasses, which may be constructed from ordinary plastics such as Mylar ® film, are tinted so as to maximize the brightness differential between the two lenses at the principal wavelengths transmitted from the television screen, but to have a substantially lower brightness differential at other wavelengths.

Figure 11:
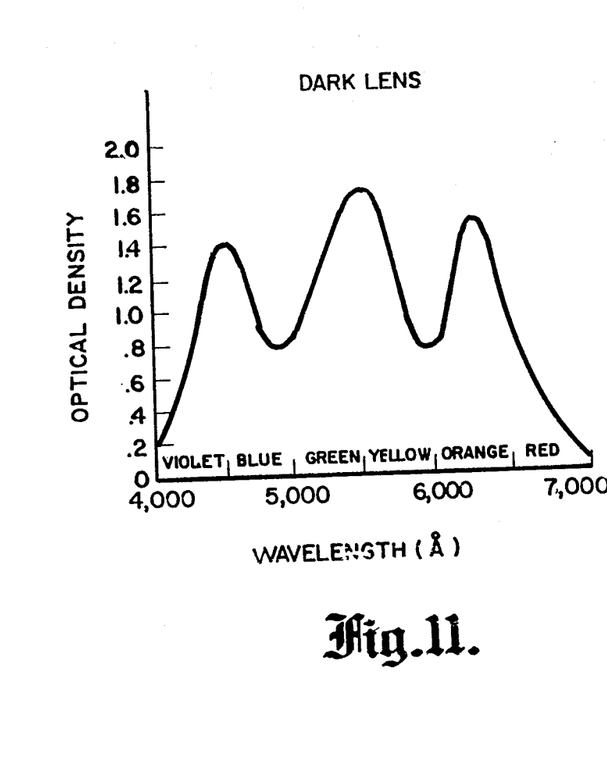
FIGS. 11 and 12 are graphs of the spectral energy emission characteristics for the dark and light lenses, respectively, in one preferred embodiment of the viewer glasses.

As illustrative spectral transmission characteristic for the darker lens is given in FIG. 11. It can be seen that the optical density of the lens peaks at the wavelength corresponding to the spectral peaks emitted from the television screen, and is substantially lower at wavelengths between these peaks. Thus, the lens blocks a substantially greater portion of the radiant energy from the screen than from normal ambient light, since the television radiant energy is concentrated about the lenses' density peaks, while normal ambient light is more evenly spread over the optical spectrum.

It should be noted that, in the preferred embodiment, the darker lens has a substantially lower optical density (higher transmissivity) in the blue region than in the green or yellow regions. This has been found to improve the overall 3-D effect and viewer comfort. The optical density in the blue region can be on the order of three or four times less than in the green-yellow region, without materially degrading the color balance of the glasses. The exact reason for the improvement in overall performance with a blue-biased filter is not known with certainty, but it has previously been determined that the human eye is typically about six times less sensitive to blue than to green or yellow. It can be theorized that a higher blue transmission in the darker lens reduces the actual optical density imbalance between the two lenses, thus giving a more "natural" look to a scene when viewed through the glasses, while the eye's relative insensitivity to blue maintains the perceived density differential. With the blue tint a greater optical density differential can be employed between the two lenses, with a correspondingly greater 3-D effect, without inducing eye strain.

Further enhancement can be obtained by designing the darker lens to have a lower optical density in the red as well as the blue region of the spectrum, as compared to its optical density in the green-yellow region. It is believed that this improvement is related to the fact that the human eye is about 2 times less sensitive to red than to green or yellow. This feature is also illustrated in FIG. 11.

Figure 12:
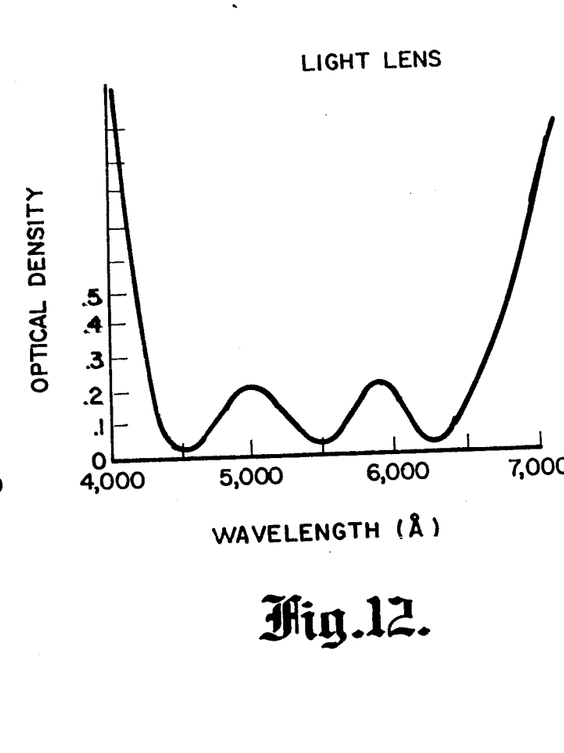

A further reduction in the "dead eye" effect, without taking away from the 3-D effect, can be obtained by color coating the lighter lens also, as illustrated in FIG. 12. The situation here is generally the reverse of the dark lens. The optical density of the lighter lens is reduced at wavelengths corresponding to the peak television emissions, thereby further increasing the effective density differential when viewing the screen, without materially increasing the density differential in normal ambient light.

Appropriate coloration of the lenses can be achieved simply by combining dyes in accordance with the desired optical transmission characteristics. Although the optical density for the darker lens can be made to peak for only one or two of the television peak emission wavebands, density peaks are preferably provided for all three emission peaks to maintain color balance. An optimum 3-D effect is achieved by tinting the two lenses so that the difference in effective optical density between the two when viewing the television screen is at least about 1.4. The "dead eye" effect is eliminated or held to acceptable levels by keeping the difference in effective optical density for normal ambient light less than about 1.2. The result is a high quality 3-D effect, while avoiding much of the distraction occasioned with the prior viewer glasses. The difference in overall optical densities between the lenses will still produce a 3-D effect, although somewhat diminished, for black and white screens.

A novel method and apparatus which require no special camera equipment, in which the image appears in full 3-D when viewed through proper glasses but as a perfectly normal two-dimensional image when viewed without the glasses, and which substantially mitigates the prior "dead eye" problem has thus been described. Many variations and alternate embodiments will occur to those skilled in the art. Accordingly, it is intended that the invention be limited only in terms of the appended claims.

I claim:

1. A 3-D television system for creating a stereoscopic effect when viewing a television image in which at least portions of the image exhibit a lateral movement, comprising:
   a television which includes a television screen having a spectral-energy emission characterized by at least three radiant energy peaks at spaced wavebands along the spectrum, and
   viewer glasses for viewing said television screen, said viewer glasses comprising:
   first means for transmitting light from the television screen to the viewer's left eye,
   second means for transmitting light from the television screen to the viewer's right eye,
   one of said light transmitting means being darker than the other light transmitting means and having a spectral transmission characterized by a substantially reduced transmissivity at wavelengths corresponding to each of said energy peaks, relative to both its transmissivity at other wavelengths within the visible spectrum and to the transmissivity of the other light transmitting means at said peak energy wavelengths, whereby the differential in light transmission between said first and second light transmitting means is greater when viewing the television screen than in normal ambient light, and
   means for holding said first and second light transmitting means in place on a viewer's face in front of his or her respective eyes.

2. The 3-D television system of claim 1, wherein the other light transmitting means has a spectral transmission characterized by a substantially reduced transmissivity at at least some wavelengths removed from said energy peaks relative to its transmissivity at wavelengths corresponding to said energy peaks, thereby increasing the differential in light transmission between said first and second light transmitting means when viewing the television screen relative to the differential in normal ambient light.

3. The viewer glasses of claim 1, wherein said one light transmitting means has a substantially higher transmissivity in the blue region than in the yellow or green regions.

4. The viewer glasses of claim 3, wherein said one light transmitting means has a substantially higher transmissivity in the red region than in the yellow or green regions.

5. A 3-D television system for creating a stereoscopic effect when viewing a television image in which at least portions of the image exhibit a lateral movement, comprising:
   a television which includes a television screen having a spectral-energy emission characterized by radiant energy peaks at spaced wavebands along the spectrum, and
   viewer glasses for viewing said television screen, said viewer glasses comprising:
      first means for transmitting light from the television screen to the viewer's left eye,
      second means for traansmitting light from the television screen to the viewer's right eye,
      one of said light transmitting means having a spectral transmission characterized by a substantially reduced transmissivity at at least one of said peak energy wavebands relative to both its transmissivity at other wavelengths within the visible spectrum and to the transmissivity of the other light transmitting means at said at least one peak energy waveband, the difference in effective optical density between the two light transmitting means when viewing the television screen being at least about 1.0, whereby the differential in light transmission between said first and second light transmitting means is greater when viewing the television screen than in normal ambient light, and
      means for holding said first and second light transmitting means in place on a viewer's face in front of his or her respective eyes.

6. The viewer glasses of claim 5, wherein the difference in effective optical density between the two light transmitting means in normal ambient light is less than about 1.2.

7. Viewer glasses for creating a stereoscopic effect when viewing a laterally moving image on a television screen having radiant energy peaks in the violet-blue, yellow-green and red-orange regions of the spectrum, comprising:
   first and second lenses, the first lens being darker than the second lens and having a lower transmissivity in each of the violet-blue, yellow-green and red-orange regions relative to both its transmissivity at other regions of its transmission spectrum and to the transmissivity of the second lens at said regions, thereby producing a differential in the overall optical transmission through said lenses which is greater for light at said regions of lower transmissivity than in normal ambient light, and
   means for holding said first and second lenses in place on a viewer's face with the first lens over one eye and the second lens over the other eye.

8. The viewer glasses of claim 7, wherein the first lens has a substantially higher transmissivity in the blue region than in the yellow or green regions.

9. The viewer glasses of claim 8, wherein the first lens has a substantially higher transmissivity in the red region than in the yellow or green regions.

10. Viewer glasses for creating a stereoscopic effect when viewing a laterally moving image on a television screen having radiant energy peaks in the violet-blue, yellow-green and red-orange regions of the spectrum, comprising:
    first and second lenses, the first lens having a lower transmissivity in at least one of the violet-blue, yellow-green or red-orange regions relative to both its transmissivity at other regions of its transmission spectrum and to the transmissivity the second lens at said at least one region, thereby producing a differential in the overall optical transmission through said lenses which is greater for light at said regions of lower transmissivity than in normal ambient light, the second lens having a lower transmissivity at at least some wavelengths removed from said radiant energy peaks than at said peaks, thereby increasing the differential between said lenses when viewing the television screen relative to the differential in normal ambient light, and
    means for holding said first and second lenses in place on a viewer's face with the first lens over one eye and the second lens over the other eye.

11. Viewer glasses for creating a stereoscopic effect when viewing a laterally moving image on a television screen having radiant energy peaks in the violet-blue, yellow-green and red-orange regions of the spectrum, comprising:
    first and second lenses, the first lens having a lower transmissivity in at least one of the violet-blue, yellow-green or red-orange regions relative to both its transmissivity at other regions of its transmission spectrum and to the transmissivity of the second lens at said at least one region, thereby producing a differential in the overall optical transmission through said lenses which is greater for light at said regions of lower transmissivity than in normal ambient light, the difffference in effective optical density between the two lenses when viewing the television screen being at least about 1.0 and
    means for holding said first and second lenses in place on a viewer's face with the first lens over one eye and the second lens over the other eye.

12. The viewer glasses of claim 11, wherein the difference in effective optical density between the two lenses in normal ambient light is less than about 1.2.

13. A method for creating a stereoscopic television effect, comprising:
    displaying an image which includes lateral movement on a television screen having a spectral-energy emission characterized by radiant energy peaks at spaced wavebands along the spectrum,
    transmitting an image of said television screen to one eye of a viewer through a first light filter, and
    transmitting a darker image of the same television screen to the viewer's other eye through a second light filter which has a reduced transmissivity at at least one of said peak energy wavebands relative to both its transmissivity at other wavelengths within the visible spectrum and to the transmissivity of said first light filter at said at least one peak energy waveband.

14. The method of claim 13, wherein said first light filter has a reduced transmissivity at at least some wavelengths removed from said peak energy wavebands.

15. The method fo claim 13, wherein the television screen has radiant energy peaks in the violet-blue, yellow-green and red-orange regions of the spectrum, and said second light filter has a reduced transmissivity in each of said regions.

16. The method of claim 15, wherein said second light filter has a substantially higher transmissivity in the blue region than in the yellow or green regions.

17. The method of claim 16, wherein said second light filter has a substantially higher transmissivity in the red region than in the yellow or green regions.

18. A method for creating a stereoscopic television effect, comprising:

visually recording a moving picture of a scene with a relative lateral movement between the scene and the recording mechanism, displaying the visual recording on a television screen having a spectral-energy emission characterized by radiant energy peaks at spaced wavebands along the spectrum, and viewing the visual recording displayed on the television screen through a light filter which has a greater optical density for one eye than for the other eye when viewing the television screen so that said one eye perceives a darker television image than said other eye, the light filter for said one eye having a reduced transmissivity at at least one of said peak energy wavebands relative to both its transmissivity at other wavelengths within the visible spectrum for said one eye and to its transmissivity at said at least one peak energy waveband for the other eye, whereby the difference in image brightness perceived by the two eyes is greater when viewing said scene on the television screen than the overall difference in light filter transmissivity for the two eyes.

19. The method of claim 18, wherein the recording mechanism is moved during recording along a generally circular arc with its field of view generally centered on the center of the arc.

20. The method of claim 18, wherein the recording mechanism is moved during recording in a generally straight line, and is directed at an angle to its motion path which is substantially greater than zero.

21. The method of claim 18, wherein the recording mechanism is rotated during recording about an internal axis.

22. The method of claim 18, wherein the scene is rotated about an internal axis to produce said relative lateral movement.

23. A method for creating a stereoscopic television effect, comprising:

visually recording a moving picture of a scene with a relative lateral movement between the scene and the recording mechanism, displaying the visual recording on a television screen having a spectral-energy emission characterized by radiant energy peaks at spaced wavebands along the spectrum, and viewing the visual recording displayed on the television through a light filter which has a greater optical density for one eye than for the other eye when viewing the television screen so that said one eye perceives a darker television image than said other eye, the light filter having a reduced transmissivity at at least one of said peak energy wavebands for said one eye, and a reduced transmissivity at at least some wavelengths removed from said energy peaks for said other eye, whereby the difference in image brightness perceived by the two eyes is greater when viewing said scene on the television screen than the overall difference in light filter transmissivity for the two eyes.

24. A method for creating a stereoscopic television effect, comprising:

visually recording a moving picture of a scene with a relative lateral movement between the scene and the recording mechanism, displaying the visual recording on a television screen having a spectral-energy emission characterized by radiant energy peaks at spaced wavebands along the spectrum, and viewing the visual recording displayed on the television screen through a light filter which has a greater optical density for one eye than for the other eye when viewing the television screen so that said one eye perceives a darker television image than said other eye, the light filter for said one eye having a reduced transmissivity at at least one of said peak energy wavebands, and a substantially higher transmissivity in the blue region than in the yellow or green regions for said one eye, whereby the difference in image brightness perceived by the two eyes is greater when viewing said scene on the television screen than the overall difference in light filter transmissivity for the two eyes.

25. The method of claim 24, wherein said light filter has a substantially higher transmissivity in the red region than in the yellow or green region for said one eye.

* * * * *